United States Patent
Hetherington et al.

(10) Patent No.: US 9,843,880 B2
(45) Date of Patent: Dec. 12, 2017

(54) ENHANCED SPATIALIZATION SYSTEM WITH SATELLITE DEVICE

(71) Applicant: 2236008 Ontario Inc., Waterloo (CA)

(72) Inventors: Phillip A. Hetherington, Port Moody (CA); Mark Fallat, Vancouver (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 91 days.

(21) Appl. No.: 14/571,896

(22) Filed: Dec. 16, 2014

(65) Prior Publication Data

US 2015/0098573 A1    Apr. 9, 2015

Related U.S. Application Data

(63) Continuation of application No. 13/020,949, filed on Feb. 4, 2011, now Pat. No. 8,913,757.

(60) Provisional application No. 61/301,745, filed on Feb. 5, 2010, provisional application No. 61/301,761, filed on Feb. 5, 2010.

(51) Int. Cl.
*H04R 3/00* (2006.01)
*H04S 7/00* (2006.01)
*H04M 3/56* (2006.01)
*H04N 7/15* (2006.01)
(Continued)

(52) U.S. Cl.
CPC .............. *H04S 7/30* (2013.01); *H04M 3/568* (2013.01); *H04N 7/15* (2013.01); *H04R 5/027* (2013.01); *H04R 5/04* (2013.01); *H04S 2400/11* (2013.01)

(58) Field of Classification Search
CPC ......... H04S 7/30; H04S 2400/11; H04R 5/04; H04R 5/027; H04N 7/15; H04M 3/568

USPC .......... 381/26, 74, 92, 17, 91, 119; 367/124, 367/125

See application file for complete search history.

(56) References Cited

U.S. PATENT DOCUMENTS 5,793,875 A    8/1998  Lehr et al.
8,135,143 B2   3/2012  Ishibashi et al.
(Continued)

FOREIGN PATENT DOCUMENTS

EP       1 206 161 A1    11/2000
EP       1206161    *    5/2002  ............... H04R 3/00
(Continued)

OTHER PUBLICATIONS

Irvine, Dr. F., et al.,"Mechanisms Underlying the Sensitivity of Neurons in the Lateral Superior Olive to Interaural Intensity Differences," *Department of Psychology, Monash University, Australia. Journal of Neurophysiology*, 2001 (pp. 2647-2666).

*Primary Examiner* — William A Jerez Lora
(74) *Attorney, Agent, or Firm* — Brinks Gilson & Lione (57) ABSTRACT

A system enhances spatialization in which spatial information about sound sources at an originating location is represented in an audio signal. The system applies a phase difference analysis to the signals received from an array of spaced apart input devices or microphones to derive spatial or directional information about the relative directions of one or more satellite input devices or microphones. The signals from the satellite input devices or microphones are mixed by a function of their respective directions to generate a multichannel output signal. When processed by a remote or local system, the output signal provides a representation of the relative directions of the sound sources at the originating location at a receiving location.

20 Claims, 3 Drawing Sheets

(51) Int. Cl.
*H04R 5/027* (2006.01)
*H04R 5/04* (2006.01)

(56) References Cited

U.S. PATENT DOCUMENTS

| | | |
|---|---|---|
| 8,379,868 B2 | 2/2013 | Goodwin et al. |
| 2003/0048760 A1 | 3/2003 | Park et al. |
| 2003/0051532 A1 | 3/2003 | Beaucoup et al. |
| 2004/0032487 A1 | 2/2004 | Chu et al. |
| 2004/0076301 A1 | 4/2004 | Algazi et al. |
| 2006/0239471 A1 | 10/2006 | Mao et al. |
| 2006/0245601 A1 | 11/2006 | Michaud et al. |
| 2007/0116297 A1 | 5/2007 | Mishra |
| 2007/0269063 A1 | 11/2007 | Goodwin |
| 2008/0165993 A1* | 7/2008 | Cho .................. H04S 7/301 381/307 |
| 2008/0228501 A1 | 9/2008 | Pang et al. |
| 2008/0232617 A1 | 9/2008 | Goodwin et al. |
| 2008/0247274 A1 | 10/2008 | Seltzer et al. |
| 2008/0285824 A1* | 11/2008 | Wildes .................. A61B 8/12 382/128 |
| 2008/0298610 A1 | 12/2008 | Virolainen et al. |
| 2009/0052688 A1 | 2/2009 | Ishibashi et al. |
| 2009/0060222 A1 | 3/2009 | Jeong et al. |
| 2009/0141908 A1 | 6/2009 | Jeong et al. |
| 2009/0226005 A1 | 9/2009 | Acero et al. |
| 2009/0238377 A1 | 9/2009 | Ramakrishnan et al. |
| 2009/0252356 A1 | 10/2009 | Goodwin et al. |
| 2009/0323981 A1* | 12/2009 | Cutler .................. H04N 7/142 381/92 |
| 2010/0110834 A1 | 5/2010 | Kim et al. |
| 2010/0260356 A1 | 10/2010 | Teramoto et al. |
| 2010/0310084 A1* | 12/2010 | Hersbach ............. H04R 25/453 381/71.6 |
| 2011/0002469 A1 | 1/2011 | Ojala |
| 2012/0093339 A1 | 4/2012 | Wu |
| 2013/0093831 A1* | 4/2013 | Cutler .................. H04N 7/142 348/14.01 |

FOREIGN PATENT DOCUMENTS

| | | |
|---|---|---|
| WO | WO 2006/006935 A1 | 1/2006 |
| WO | WO 2009/109217 A1 | 9/2009 |

* cited by examiner

ENHANCED SPATIALIZATION SYSTEM WITH SATELLITE DEVICE

PRIORITY CLAIM

This application is a continuation of U.S. patent application Ser. No. 13/020,949, filed Feb. 4, 2011, issued as U.S. Pat. No. 8,913,757, which claims the benefit of priority from U.S. Provisional Application Nos. 61/301,745 and 61/301,761, both of which were filed on Feb. 5, 2010, which are incorporated by reference.

BACKGROUND OF THE INVENTION

1. Technical Field

This disclosure relates to the field of multichannel communications. In particular, to a system that enhances spatialization with a satellite device.

2. Related Art

Some voice communication has been carried out over a single audio channel and often over a narrow band of the audio spectrum, between 200 Hz and 3500 Hz. This has made some voice communications difficult to understand. When voice communication is paired with a video feed (i.e., in a video conferencing system) the low quality voice communication can significantly degrade the overall user experience.

Some video conferencing systems use an array of microphones. The physical arrangement of one microphone, in relation to another microphone, is not fixed and a microphone may be moved while a conference is in progress, for example, to situate them closer to particular speakers at different times.

The microphone signals from the main microphones and an ancillary microphone may be mixed with an emphasis on making all speakers intelligible irrespective of which microphone they are nearest to. The spatial information is not well represented in the output signals or presented at the other end of the video conference. This can be confusing or annoying for participants as the voices coming out of loudspeakers do not have a spatial layout that corresponds to the apparent positions of the speakers on the video display device.

SUMMARY

A system enhances spatialization in which spatial information about sound sources at an originating location is represented in an audio signal. The system applies a phase difference analysis to the signals received from an array of spaced apart input devices or microphones to derive spatial or directional information about the relative directions of one or more satellite input devices or microphones. The signals from the satellite input devices or microphones are mixed as a function of their respective directions to generate a multichannel output signal. When processed, the output signal provides a representation of the relative directions of the sound sources at the originating location.

Other systems, methods, features and advantages will be, or will become, apparent to one with skill in the art upon examination of the following figures and detailed description. It is intended that all such additional systems, methods, features and advantages be included with this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A system enhances spatialization among a plurality of directional or omnidirectional inputs devices that may operate in tandem to convert sound into analog signals or digital data. Hardware and software convert and transmit voiced and unvoiced input signals across a wireless (e.g., radio, microwave, etc.) or physical medium to a system that enables a Signal-To-Noise (SNR) ratio and spatial scalability. The directionality of the voiced and unvoiced input signals may be identified, mixed, and routed into one or more channels that may be transmitted through a wireless or fixed medium to a multi-dimensional output system. A transmitter may electrically encode data or the signals that are then radiated or conveyed to an output system. The output system may decode the received signals at a receiver to derive multiple dimensional separations between the directional or omnidirectional inputs. The output may be reproduced to render a substantially original directionality of the received signals or, alternatively, may be scaled to exploit the separation between those signals.

Figure 1:
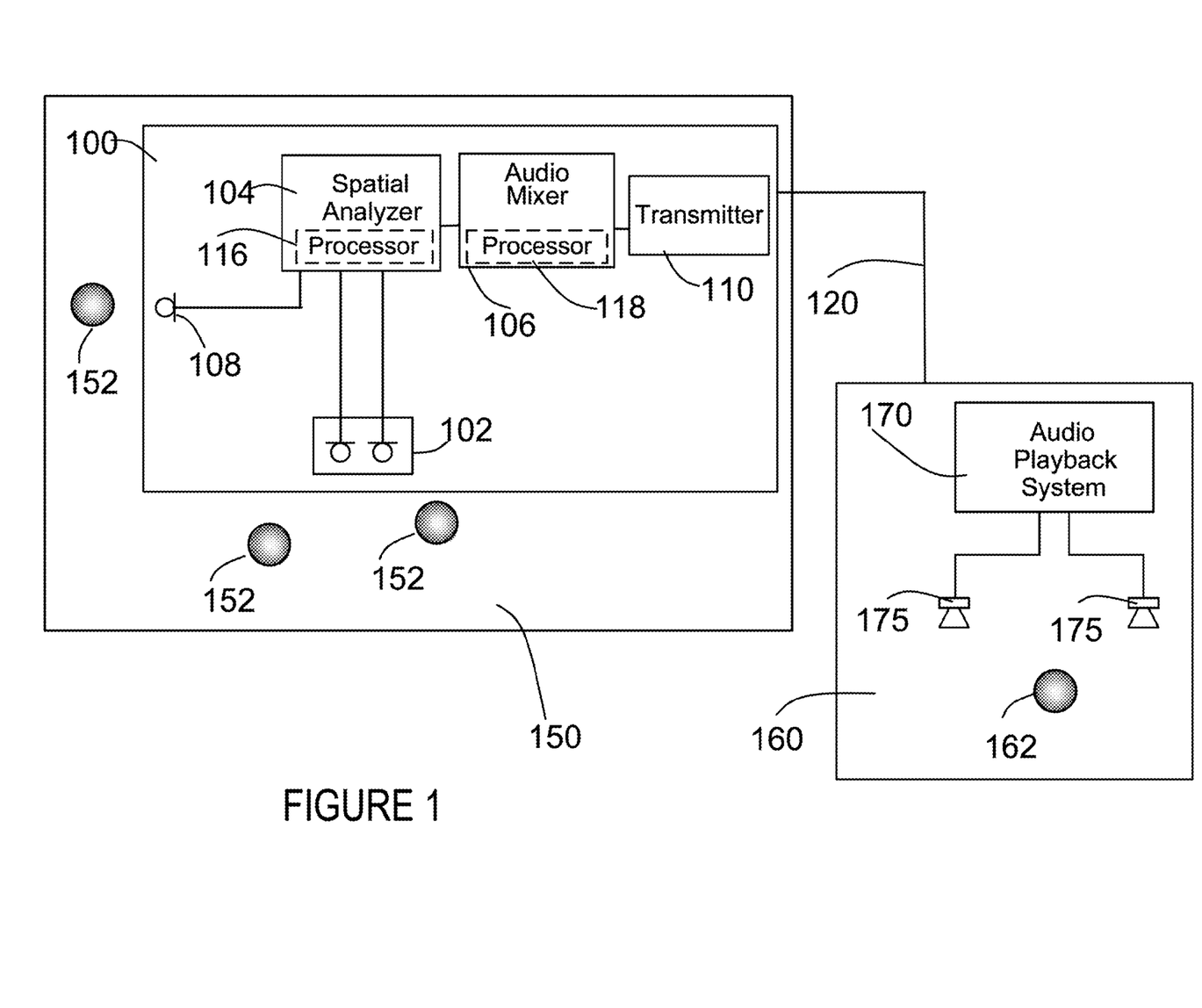
FIG. 1 is a system that enhances spatialization with a satellite input device or satellite microphone.
Figure 3:
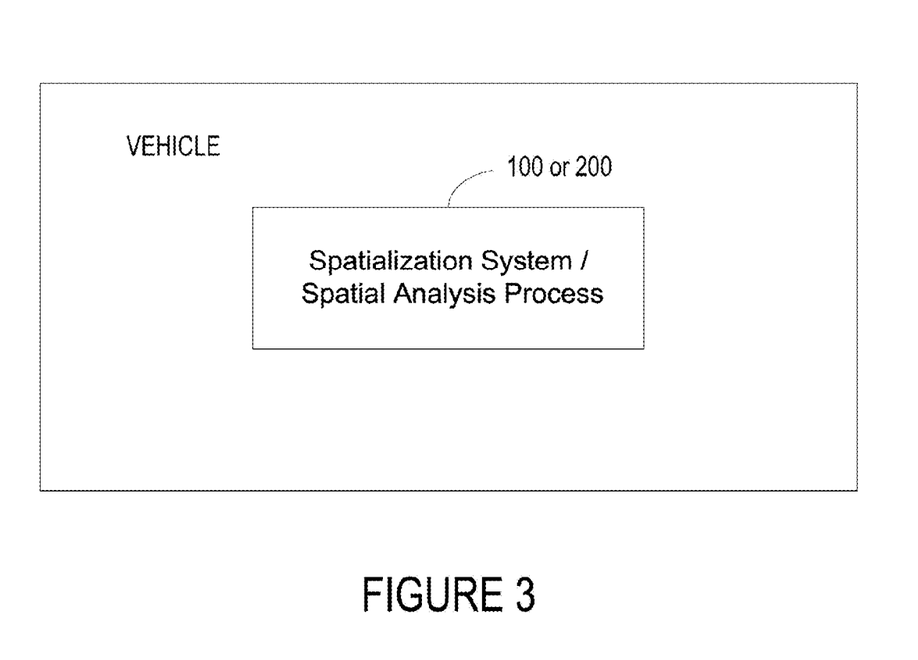
FIG. 3 is a block diagram of the spatialization system/spatialization process within a vehicle.

FIG. 1 is a schematic of a system 100 that enhances spatialization. The system 100 may be positioned at an originating location 150 in a communication arrangement such as, for example, a teleconferencing or video conferencing room, an interior of a vehicle (e.g., FIG. 3), or within any communication or telecommunication device that processes audible sound from one or more sound sources, or speakers 152. The system 100 may comprise devices that convert audible sound from one, two or more sound sources 152 into electrical or optical signals. In some systems a microphone array 102 and a satellite input device or satellite microphone 108 may convert sound into analog, discrete, optical or electrical signals. The microphone array 102 may, for example, comprise a pair of closely spaced omnidirectional microphones. In some systems 100, the omnidirectional microphones may be spaced less than about a wavelength apart for frequencies within a spectrum of interest. The satellite input device may have an omnidirectional receiving pattern or selectable (e.g., user-selectable) receiving patterns that may favor sound sourced from one or more directions while being less sensitive to sounds traveling from other directions. Additional hardware and software such as a wireless or tangible serial or parallel interface and bus may convey the output signal to a spatial analyzer 104 and an audio mixer 106. The spatial analyzer 104 may receive, and in some systems, decode through a decoder or converter the signals from each of the microphones that may comprise the microphone array 102 and the satellite microphone 108. The microphone signals (e.g., that may be processed as channels) are analyzed to derive a directionality such as the directions of sound received from the satellite microphone 108 relative to the microphone array 102. The signals may then be combined, routed, and further processed to change the level, timbre, and/or dynamics of the audio signal. An electronic device, such as a transmitter 110 may encode the signals that may then be conveyed or radiated through a transmission media to another location. In some systems the transmitter 110 conveys signals through frequency modulation, amplitude modulation, or any wireless communication protocol such as cellular (e.g., Code Division Multiple Access (CDMA), Global System for Mobile Communication (GSM), etc.), Bluetooth, WLAN, WiFi, Hyper/LAN, Ultraband, WiMax, Mobile-Fi, or ZigBee mobility.

Figure 2:
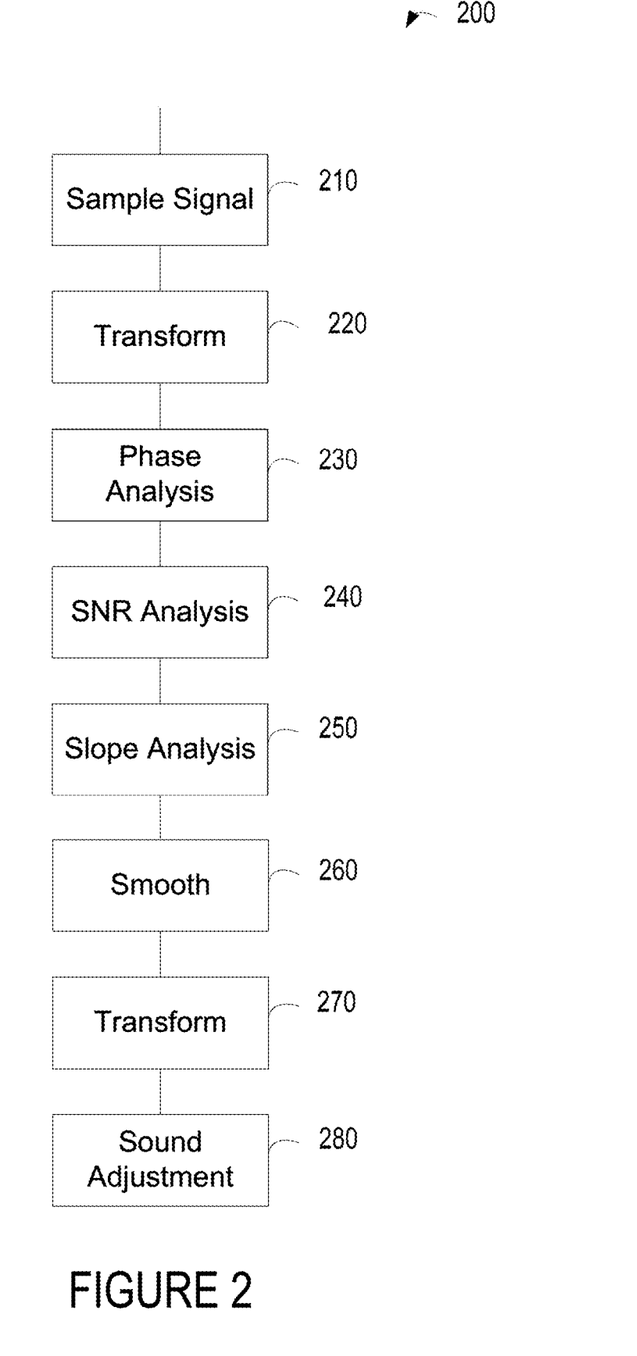
FIG. 2 is a spatial analysis process.

The directionality of the input signals may be derived through the spatial analyzer 104 that may execute or may be configured to execute the functions of a spatial analysis process. An exemplary spatial analysis process 200 may process the received signal in one, two, or more communication domains or compressions (e.g., signal strength may be represented as a function of frequency, time, wavelets, etc.) In FIG. 2, the spatial analysis process 200 may transform the entire or selected portions of the outputs of the microphone array 102 and satellite microphone 108 signals into the frequency domain through 210 and 220. Through spatial analysis hardware or the execution of software, the analysis process 200 may compute a phase for each or selected microphone array 102 signals and the satellite microphone 108 signal over a range of frequencies. The spatial analysis 200 may calculate a phase difference between the microphone array 102 signals and satellite microphone 108 signals at 230, compute or measure a signal to noise ratio (SNR) for each of one or more frequency bins of interest at 240, and compute or derive a SNR weighted slope of the phase difference as a function of frequency at 250. Based on the change in phase with respect to the change in frequency, the spatial analysis 200 may derive a direction of the sound(s) received at the satellite microphone 108 relative to the sound(s) received at the microphone array 102 through the SNR weighted slope. In some two-dimensional processes a positive slope may indicate that the satellite microphone 108 is positioned at or closer to one side of the microphone array 102 and a negative slope may indicate that the satellite microphone 108 is positioned at or closer to a second or an opposite side of the microphone array 102.

To limit sudden changes in derived sound directionality, a smoothing process may smooth the identified directionality over time at 260, through a smoothing circuit. The spatial analysis process may calculate the root-mean-square (RMS) of the amplitude of the satellite microphone 108 signal and the microphone array 102 signals, respectively. The directionality of the satellite microphone 108 may be stored in local or distributed memory devices and updated synchronously or when predetermined or user-set conditions are met. In some systems, the directionality of the satellite microphone 108 signals are stored when the slope of the smoothed direction is above a predetermined or user-set threshold, the RMS of the amplitude of the satellite microphone 108 signal is above a user-set or predetermined threshold, and/or when the RMS of the amplitude of the satellite microphone 108 signal is about twice as large as the RMS of the amplitude of the microphone array 102 signals. At 270, the spatial analysis process may convert the smoothed signal to another domain such as a temporal domain at 270, before the analog or digital signals that comprise the satellite microphone 108 signals are routed to one or more audio channels that include the processed analog or digital signals that comprise the output of the microphone array 102. At 280, the satellite microphone 108 signals may be further processed with the microphone array 102 signals to change the level of timber and/or dynamics of the audio signal at 280. In FIG. 1, an audio mixer 106 may mix or proportionally mix the satellite microphone 108 signal into one or more channels of a multichannel output signal 120 as a function of (or based on) the direction of the input to the satellite microphone 108 relative to the input to the microphone array 102 that may be derived through the analysis process 200. The audio mixer 106 preserves the content received at the satellite microphone 108 with the content received at microphone array 102.

The system 100 may process the voices (or acoustic signal) of far-field, relative to the microphone array 102 and the satellite microphone 108, speakers 152 (or sound sources). The direction of the satellite microphone 108 may be smoothed over time to provide a stable identified directionality to the audio mixer 106. The direction may be asynchronously updated in time, for example, when it appears that the satellite microphone 108 may have been moved relative to the microphone array 102, during pauses in detected speech, or alternatively, may be synchronously updated in time. A ratio (e.g., SNR) of the energy of the satellite microphone 108 signal compared to the microphone array 102 signals may be processed by a processor or comparator as an indicator of a satellite microphone 108 movement.

The output signal 120 may be transmitted through a wireless or tangible medium to a local or remote receiving location 160 where an audio playback system 170 converts the transmitted signal 120 (also known as "output signal 120") into perceptible forms. In FIG. 1, the audio playback system 170 may convert the output signal 120 into aural signals near one or more receivers or listeners 162 through two or more output devices such as loudspeakers 175. The listeners 162 may perceive spatial and/or positional information (e.g., the derived direction and/or position of the satellite microphone 108 relative to the microphone array 102) in the output of the loudspeakers 175. The voices of each speaker 152 proximate to the satellite microphone 108 may be perceived to come from a position or direction (e.g., through two, three, or more dimensions or coordinate directions such as left, a right, etc., direction) in the receiving location 160 that is related to their relative positions in the originating location 150. The listeners 162 may experience a higher quality fidelity (e.g., an enhanced spatialization) in which they are able to associate a relative spatial location or position with each of the speakers' 152 voices, which may further improve intelligibility.

The system 100 may be used at a common location (e.g., the originating location 150) of a communication arrangement, at two or more local locations, or alternatively, may be distributed across some or all remote participating locations in a communication arrangement or communication network. To render the spatial information contained in an aural or multimedia output signal 120 from another location (e.g., an originating location 150) each terminating location (e.g., each receiving location 160) may tangibly or wirelessly interface one or more multichannel playback systems 170 that interface or couple a plurality of output devices such as loudspeakers 175.

The system 100 may process two channels (e.g., stereo) through an input interface of an audio mixer 106. The audio mixer 106 may receive and decode the channels through a decoder. The audio playback system 170 may process the stereo output signals and transmit the content through two or more loudspeakers 175 to render a more natural sound distribution.

The system 100 may be used with one, two, or more satellite microphones 108. A direction for each satellite microphone 108 may be derived by a spatial analysis process. The output of each satellite microphone 108 may be processed and mixed with the output of microphone array 102. The satellite output may be routed to one or more audio channels, and may be processed with the array output to change the timbre and/or dynamics of the signals. In some systems, a post spatial analysis occurs through a mixer that may mix analog or digital signals, depending on the type of mixer, and then sums the modified signals to produce a combined output. A transmitter 110 may then transmit the output to one or more receiving locations 160. Besides the hardware implementations that are referenced or in the alternative, the spatial analysis method 200 or functionality may be implemented in software retained in a fixed computer readable medium that may be executed by a processor.

Figure 4:
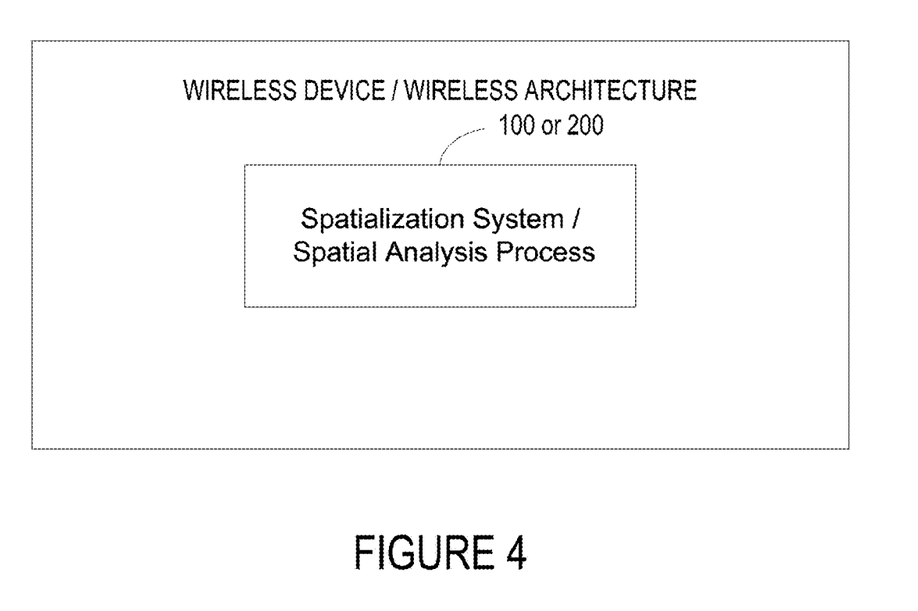
FIG. 4 is a block diagram of the spatialization system/spatialization process within a wireless device/wireless architecture.

The system, methods, and descriptions described may be programmed in one or more controllers, devices, processors such as signal processors (e.g., processors 116 and 118) that may execute all or some of the functionality (e.g., the system may execute any combination of acts) shown in FIG. 2. The processors may comprise one or more central processing units or digital signal processors that supervise the sequence of micro-operations that execute the instruction code and data coming from memory (e.g., computer readable medium) that generate, support, and/or complete an operation, compression, or signal modifications. The dedicated applications may support and define the functions of the special purpose processor or general purpose processor that is customized by instruction code (and in some applications may be resident to vehicles, communication systems, audio systems, telephones, teleconferencing systems, cellular systems, etc.). In alternative implementations, the system 100, satellite microphones 108, or some of all of the acts of the spatial analysis process 200 may be executed or comprise an integrated or unitary part of a fixed or mobile wireless device, interface an in-vehicle bus, interface a universal serial bus (or buses having a bandwidth of about 1.5 megabits per second or greater) or interface cables such as an interface to audio or multimedia cables. Some or all of the components of the system 100 and/or some or all of the acts of the spatial analysis process 200 may be integrated within or comprise a unitary part of a vehicle (e.g., FIG. 3) wireless device (e.g., FIG. 4) such as a smart phone, portable computer, personal mobile computer, a touch screen based device (e.g., Tablet Computers), or comprise part of a wireless architecture, e.g., FIG. 4). In some systems, a front-end processor may perform the complementary tasks of gathering data for a processor or program to work with, and for making the data and results available to other processors, controllers, or devices. In some systems, processors 116 and/or 118 may comprise a single processor that interfaces with, is an integrated part of, or is a unitary part of the spatial analyzer 104.

The systems, methods, and descriptions may program one or more signal processors or may be encoded in a signal bearing storage medium, a computer-readable medium, or may comprise logic stored in a memory that may be accessible through an interface and is executable by one or more processors. Some signal-bearing storage medium or computer-readable medium comprise a memory that is unitary or separate (e.g., local or remote) from a device, programmed within a device, such as one or more integrated circuits, or retained in memory and/or processed by a controller or a computer. If the descriptions or methods are performed by software, the software or logic may reside in an electronic or optical memory resident to or interfaced to one or more processors, devices, or controllers that may support a tangible or visual communication interface (e.g., to a display), wireless communication interface, or a wireless system.

The memory may retain an ordered listing of executable instructions in a processor, device, or controller accessible medium for implementing logical functions. A logical function may be implemented through digital circuitry, through source code, or through analog circuitry. The software may be embodied in any computer-readable medium, signal-bearing medium, or other non-transitory medium for use by, or in connection with, an instruction executable system, apparatus, and device, resident to system that may maintain persistent or non-persistent connections. Such a system may include a computer system, a processor-based system, or another system that includes an input and output interface that may communicate with a publicly accessible or privately accessible distributed network through a wireless or tangible communication bus through a public and/or proprietary protocol.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the present invention. Accordingly, the invention is not to be restricted except in light of the attached claims and their equivalents.

We claim:

1. A system that enhances spatialization with a satellite microphone comprising:
   a plurality of microphones arranged in an array that convert sound waves into electrical signals;
   a satellite device that processes sound waves at a location remote from the plurality of microphones, wherein the satellite device is movable relative to the plurality of microphones; and
   a spatial analyzer configured to:
   analyze the sound waves received by the plurality of microphones and the sound waves received by the satellite device to derive a directionality of the sound waves received by the satellite device relative to a directionality of the sound waves received by the plurality of microphones;

determine whether the satellite device has changed position relative to the plurality of microphones;

smoothing the directionality of the sound waves recived by the satellite device related to the directionality of the sound waves recived by the plurality of microphones over time to limit sudden changes in derived sound directionality; and when a specified condition is met, update the directionality of the sound waves received by the satellite device relative to the directionality of the sound waves received by the plurality of microphones.

2. The system of claim 1 wherein the spatial analyzer further transforms the electrical signals from the plurality of microphones into frequency domain information and transforms the electrical signals received from the satellite device into frequency domain information.

3. A system that enhances spatialization with a satellite microphone comprising:

a plurality of microphones arranged in an array that convert sound waves into electrical signals;

a satellite device that processes sound waves at a location remote from the plurality of microphones, wherein the satellite device is moveable relative to the plutality of microphones; and a spatial analyzer configured to;

analyze the sound waves recived by the plurality of microphoned and the sound waves received by the satellite device to derive a directionality of the sound waves received by the satellite device related to a directionality of the sound waves received by the plurality of microphones;

determine wether the satellite device has changed position relative to the plurality of microphones;

determines a phase difference between the electrical signals from the plurality of microphones and electrical signals received from the satellite device over a range of frequency bins;

determines a signal to noise ratio (SNR) for each of one or more frequency bins within the range for the plurality of microphones and the satellite device; and determines a SNR weighted slope of the phase differences as a function of frequency; and derives a directionality of sound received at the satellite device relative to the directionality of sound received by the plurality of microphones based on the SNR weighted slope of the phase differences as a function of frequency; and when a specified condition is met, update the directionality of the sound waves recived by the satellite device relative to the directionality of the sound waves received by the plurality of microphones.

4. The system of claim 3 wherein the spatial analyzer further smooths the directionality of sound received at the satellite device relative to the directionality of sound received by the plurality of microphones over time.

5. The system of claim 4 wherein the spatial analyzer further updates in storage the directionality of sound received at the satellite device relative to the directionality of sound received by the plurality of microphones:

based on comparison of a threshold with a slope of the smoothed directionality of sound received at the satellite device relative to the directionality of sound received by the plurality of microphones; or based on comparison of a threshold with a root mean square of an amplitude of the electrical signals received from the satellite device.

6. The system of claim 5 further comprising a mixer that proportionally mixes the electrical signals received from the satellite device with the electrical signals from the plurality of microphones into channels of a multichannel output signal based on the directionality of sound received at the satellite device relative to the directionality of sound received by the plurality of microphones.

7. The system of claim 1 wherein the plurality of microphones arranged in the array comprises a plurality of microphones spaced less than a wavelength apart for selected frequencies.

8. A method comprising:

converting sound waves into electrical signals in a plurality of microphones arranged in an array;

processing sound waves by a satellite device that is located remotely from the plurality of microphones, wherein the satellite device is movable relative to the plurality of microphones; and analyzing, by a spatial analyzer, the sound waves received by the plurality of microphones and the sound waves received by the satellite device to derive a directionality of the sound waves received by the satellite device relative to a directionality of the sound waves received by the plurality of microphones;

determining whether the satellite device has changed position relative to the plurality of microphones;

smoothing the directionality of the sound waves recieved by the satellite device relative to the directionality of the sound waves received by the plurality of microphoned over time to limit sudden changes in derived sound directionality; and when a specified condition is met, updating the directionality of the sound waves received by the satellite device relative to the directionality of the sound waves received by the plurality of microphones.

9. The method of claim 8 further comprising transforming the electrical signals from the plurality of microphones into frequency domain information and transforming the electrical signals received from the satellite device into frequency domain information.

10. A method comprising:

converting sound waves into electical signals in a plurality of microphones arranged in an array;

processing sound waves by a satellite device that is located remotely from the purality of microphones, wherein the satellite device is movable relative to the plurality of microphones; and analyzing by a spatial analyzer, the sound waves received by the plurality of microphones and the sound waves received by the satellite device to derive a directionality of the sound waves received by the satellite device relative to a directionality of the sound waves received by the plurality of microphones;

determining whether the satellite device has changed position relative to the plutality of microphones;

determining a phase difference between the electrical signals from the plurality of microphones and the electrical signals received from the satellite device over a range of frequency bins;

determining a signal to noise ratio (SNR) for each frequency bin within the range for the plurality of microphones and the satellite device;

determining a SNR weighted slope of the phase differences as a function of frequency; and deriving the directionality of the sound waves received by the satellite device relative to a directionality of the sound waves received by the plurality of microphones based on the SNR weighted slope of the phase differences as a function of frequency; and when a specified condition is met, updating the directionality of the sound waves received by the satellite device relative to the directionaliy of the sound waves received by the plurality of microphones.

11. The method of claim 10 further comprising smoothing the directionality of the sound waves received by the satellite device relative to the directionality of the sound waves received by the plurality of microphones over time.

12. The method of claim 11 further comprising updating in storage the directionality of the sound waves received by the satellite device relative to the directionality of the sound waves received by the plurality of microphones:

based on comparison of a threshold with a slope of the smoothed directionality of the sound waves received by the satellite device relative to the directionality of the sound waves received by the plurality of microphones; or based on comparison of a threshold with a root mean square of an amplitude of the electrical signals received from the satellite device.

13. The method of claim 12 further comprising proportionally mixing the electrical signals received from the satellite device with the electrical signals from the plurality of microphones into channels of a multichannel output signal based on the directionality of the sound waves received by the satellite device relative to the directionality of the sound waves received by the plurality of microphones.

14. The method of claim 8 wherein the plurality of microphones arranged in the array comprises a plurality of microphones spaced less than a wavelength apart for selected frequencies.

15. A non-transitory computer readable medium having stored thereon computer program instructions that when executed by a processor cause the processor to perform steps operations comprising:

converting sound waves into electrical signals in a plurality of microphones arranged in an array;

processing sound waves by a satellite device that is located remotely from the plurality of microphones, wherein the satellite device is movable relative to the plurality of microphones; and analyzing, by a spatial analyzer, the sound waves received by the plurality of microphones and the sound waves received by the satellite device to derive a directionality of the sound waves received by the satellite device relative to a directionality of the sound waves received by the plurality of microphones;

determining whether the satellite device has changed position relative to the plurality of microphones;

smoothing the directionality of the sound waves received by the satellite device relative to the directionality of the sound waves received by the plitality of microphones over time to limit sudden changes in derived sound directionality; and when a specified condition is met, updating the directionality of the sound waves received by the satellite device relative to the directionality of the sound waves received by the plurality of microphones.

16. The non-transitory computer readable medium of claim 15, wherein the computer program instructions further cause the processor to perform steps operations comprising:

transforming the electrical signals from the plurality of microphones into frequency domain information and transforming the electrical signals received from the satellite device into frequency domain information.

17. A non-transitory computer readable medium having stored thereon computer program instructions that when executed by a processor cause the processor to perform steps operations comprosing:

converting sound waves into electrical signals in plurality of microphoned arranged in an array;

processing sound waves by a satellite device that is located remotely from the plurality of microphones, wherein the satellite device is movable relative to the plurality of microphones; and analyzing by a spatial analyzer, the sound waves received by the plurality of microphones and the sound waves received by the satellite device to derive a directionality of the sound waves received by the satellite device relative to a directionality of the sound waves received by the plurality of microphones;

determining a phase difference between the electrical signals from the plurality of microphones and the electrical signals received from the satellite device over a range of frequency bins;

determining a signal to noise ratio (SNR) for each frequency bin within the range for the plurality of microphones and the satellite device;

determining a SNR weighted slope of the phase differences as a function of frequency; and determining wether the satellite device has changed position relative to the plurality of microphones;

deriving the directionality of the sound waves received by the satellite device relative to a directionality of the sound waves received by the plurality of microphones based on the SNR weighted slope of the phase differences as a function of frequency; and when a specified condition is met, updating the directionality of the sound waves received by the satellite device relative to the directionality of the sound waves received by the plurality of microphones.

18. The non-transitory computer readable medium of claim 17, wherein the computer program instructions further cause the processor to perform steps operations comprising:

smoothing the directionality of the sound waves received by the satellite device relative to the directionality of the sound waves received by the plurality of microphones over time.

19. The non-transitory computer readable medium of claim 18, wherein the computer program instructions further cause the processor to perform steps operations comprising:

updating in storage the directionality of the sound waves received by the satellite device relative to the directionality of the sound waves received by the plurality of microphones:

based on comparison of a threshold with a slope of the smoothed directionality of the sound waves received by the satellite device relative to the directionality of the sound waves received by the plurality of microphones; or based on comparison of a threshold with a root mean square of an amplitude of the electrical signals received from the satellite device.

20. The non-transitory computer readable medium of claim 19, wherein the computer program instructions further cause the processor to perform steps operations comprising:

proportionally mixing the electrical signals received from the satellite device with the electrical signals from the plurality of microphones into channels of a multichannel output signal based on the directionality of the sound waves received by the satellite device relative to the directionality of the sound waves received by the plurality of microphones.

\* \* \* \* \*

UNITED STATES PATENT AND TRADEMARK OFFICE
CERTIFICATE OF CORRECTION

PATENT NO. : 9,843,880 B2
APPLICATION NO. : 14/571896
DATED : December 12, 2017
INVENTOR(S) : Phillip A. Hetherington et al.

Page 1 of 2

It is certified that error appears in the above-identified patent and that said Letters Patent is hereby corrected as shown below:

In the Claims

In Column 7, Claim 1, Line 3, after "sound waves" replace "recived" with --received--.

In Column 7, Claim 1, Line 4, after "satellite device" replace "related" with --relative--.

In Column 7, Claim 1, Line 5, after "sound waves" replace "recived" with --received--.

In Column 7, Claim 3, Line 23, after "device is" replace "moveable" with --movable--.

In Column 7, Claim 3, Line 23, after "relative to the" replace "plutality" with --plurality--.

In Column 7, Claim 3, Line 26, after "sound waves" replace "recived" with --received--.

In Column 7, Claim 3, Line 29, after "satellite device" replace "related" with --relative--.

In Column 7, Claim 3, Line 32, before "the satellite device" replace "wether" with --whether--.

In Column 7, Claim 3, Line 49, after "sound waves" replace "recived" with --received--.

In Column 8, Claim 8, Line 27, after "sound waves" replace "recived" with --received--.

In Column 8, Claim 8, Lines 29-30, after "the plurality of" replace "microphoned" with --microphones--.

In Column 8, Claim 10, Line 42, after "sound waves into" replace "electical" with --electrical--.

In Column 8, Claim 10, Line 45, after "from the" replace "purality" with --plurality--.

In Column 8, Claim 10, Line 55, after "relative to the" replace "plutality" with --plurality--.

Signed and Sealed this
First Day of May, 2018

Andrei Iancu
*Director of the United States Patent and Trademark Office*

CERTIFICATE OF CORRECTION (continued)
U.S. Pat. No. 9,843,880 B2

In Column 9, Claim 10, Line 5, after "relative to the" replace "directionaliy" with --directionality--.

In Column 9, Claim 15, Line 54, after "received by the" replace "plitality" with --plurality--.

In Column 10, Claim 17, Line 4, after "operations" replace "comprosing" with --comprising--.

In Column 10, Claim 17, Line 6, before "arranged in an array;" replace "microphoned" with --microphones--.

In Column 10, Claim 17, Line 26, before "the satellite device" replace "wether" with --whether--.